United States Patent [19]

Weaver et al.

[11] 3,934,046
[45] Jan. 20, 1976

[54] WATER LEACHING PRE-FRIED POTATO SLICES

[75] Inventors: Merle L. Weaver, Martinez; Masahide Nonaka, Moraga, both of Calif.

[73] Assignee: The United States of America as represented by the Secretary of Agriculture, Washington, D.C.

[22] Filed: Apr. 6, 1973

[21] Appl. No.: 348,568

[52] U.S. Cl. ............... 426/418; 426/431; 426/441; 426/456; 426/637; 426/518
[51] Int. Cl.² ............................................. A23L 1/20
[58] Field of Search .......... 426/441, 438, 431, 347, 426/146, 506, 509, 385, 455, 456, 443, 444, 637, 524, 418

[56] References Cited
UNITED STATES PATENTS

| 3,050,404 | 8/1962 | Traisman | 426/441 |
|---|---|---|---|
| 3,438,792 | 4/1969 | Kruger | 426/385 |
| 3,518,097 | 6/1970 | Menzi | 426/385 |
| 3,573,070 | 3/1971 | Smith | 426/456 |
| 3,597,239 | 8/1971 | Vohlsing | 426/438 |
| 3,634,095 | 1/1972 | Willard | 426/441 |
| 3,644,129 | 2/1972 | Sloan | 426/509 |
| 3,649,305 | 3/1972 | Wilder | 426/444 |
| 3,660,113 | 5/1972 | Ng | 426/441 |
| 3,669,685 | 6/1972 | Weaver | 426/431 |
| 3,729,323 | 4/1973 | Nonaka | 426/441 |

*Primary Examiner*—Norman Yudkoff
*Assistant Examiner*—Martin G. Mullen
*Attorney, Agent, or Firm*—M. Howard Silverstein; William Takacs; Max D. Hensley

[57] ABSTRACT

The invention enables the production of fried potato products of greatly improved texture, flavor, and color from raw stock that exhibits excessive browning tendencies and which would normally yield fried products of excessively dark color. Typically, pieces of raw potato are pre-fried in edible oil for a short period, then leached with water. The leached pieces may be further processed in various ways, e.g., finish-fried, or par-fried and then refrigerated for distribution to the consumer or food service operator.

6 Claims, No Drawings

WATER LEACHING PRE-FRIED POTATO SLICES

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel methods for enhancing texture, maintaining flavor, and preventing darkening of fried potato products, e.g., potato chips, French-fried potatoes, shoestring potatoes, pan-fried potatoes, and the like. Further objects of the invention will be evident from the following description wherein parts and percentages are by weight unless otherwise specified.

Throughout this description reference is made to operations of frying in oil. It will be understood that the oil used in such operations is an edible one, and the term includes the edible glycerides which are normally solid as well as those which are normally liquid.

Although the production of fried potato products is a relatively simple procedure, one very important problem repeatedly confronts the manufacturer, namely, the consistent production of products of acceptable light, uniform color. Darkening is brought about by variation in the chemical composition of the raw potatoes, and is explained as follows:

If the potatoes are freshly harvested or have been stored after harvest at a temperature of about 50°F. or above, few complications will generally occur. Under such circumstances, the raw pieces can be readily fried to yield a product of acceptable color. However, when the potatoes have been kept at the lower temperatures of commercial storage (that is, cold storage temperatures of about 40° to 45°F.) necessary for holding the tubers longer than about three months, complications set in. Potatoes held under such cold storage conditions tend to darken on frying to give products of very undesirable dark brown color, that is, products which are not marketable.

The reasons why such potatoes tend to darken excessively can be explained as follows: When the potatoes are kept in cold storage, part of the starch in the tubers is converted into glucose or other reducing sugars. Thus it has been shown, for example, that the browning tendency of the tubers increases as the content of reducing sugars increases. It has also been demonstrated that the reducing sugars react with the nitrogenous constituents in the potatoes, producing dark-colored reaction products. During the frying operation this browning reaction proceeds very rapidly at the high temperature to which the potatoes are subjected. It is to be emphasized, however, that regardless of the theory involved, it is well established that potatoes which have been kept in cold storage brown excessively on frying, as discussed above.

A known method for remedying the situation outlined above involves "reconditioning" the potatoes which had been kept in cold storage. This reconditioning involves holding the potatoes at a temperature of about 70°F. for a period of about 1 to 3 weeks. The basis for the treatment is that during the holding period at the stated temperature, the content of reducing sugars is progressively decreased.

Although reconditioning is used in industry, it gives rise to its own problems and disadvantages. One item is that it is expensive as it involves extra handling costs, tying up of large quantities of potatoes, and added storage space and facilities for carrying out the treatment. Also, losses are involved, e.g., loss in weight due to evaporation of water, loss of solids due to respiration (conversion of carbohydrate contents into $CO_2$), and losses due to sprouting and spoilage by microorganisms and/or insects or other pests. Another item is that some varieties (White Rose and Red La Soda, for example) do not adequately respond to reconditioning; hence, if such potatoes have been subjected to cold storage they cannot be used at all.

Another method for preventing undesirable darkening involves leaching the raw potato pieces with hot water prior to frying, whereby to reduce their content of reducing sugars. Although this procedure of leaching with hot water is used industrially, it is subject to several disadvantages. In the case of French-fried potatoes, the procedure is not always effective to avoid darkening. In addition, serious impairment of texture and flavor is often encountered. In the case of potato chips, hot-water leaching is not employed because texture and flavor are almost completely destroyed under conditions necessary to adequately prevent darkening.

An object of the invention is to provide the means for remedying the problems outlined above. A particular advantage of the invention is that it provides products of acceptable color even where the raw stock contains excessive amounts of reducing sugar and would be unsuitable for use unless it were reconditioned prior to conversion to fried products. Another important advantage of the invention is that it enables the formation of fried products of desirable properties from varieties which are normally unsuitable because of their inability to respond to reconditioning.

The process of this invention involves, essentially, the following steps: Pieces of raw potato are pre-fried, that is, fried for a short time in hot oil. Next, the pre-fried pieces are leached by contact with water. Following the application of these critical steps, the treated pieces may be subjected to any of various procedures, depending on the type of final product desired.

The critical item in the invention is the combination of the steps of pre-frying and water-leaching. The pre-fry insolubilizes starch and proteins, thereby maintaining flavor that would otherwise be lost in the leaching step. In addition, the pre-fry conditions the cells in such a way as to provide rapid removal of sugars in the subsequent water-leaching step. It is a special attribute of the invention that such sugars are removed equally from the entire surface area of each potato piece. As a result, excessive browning, which would normally take place, is prevented or at least substantially lessened. It is to be emphasized, however, that regardless of the theory involved, we have demonstrated that our process is effective, hence the invention is not to be limited to any particular theory or mechanism of action.

A particular advantage of the invention is that the color of the final product can be varied over a wide range. This is so because the final color is dependent upon the degree of sugar removal and this in turn is dependent upon the times and temperatures employed in the water-leaching step following the pre-fry. Thus, by adjusting these variables one can control color of the final product to meet specific consumer demands.

Another advantage of the invention is that the texture of the products is enhanced. For example, when French-fries are prepared in accordance with the invention, the combination of a pre-fry and a water-leach followed by a conventional par-fry increases the crispness of the exterior of the potato piece, but at the same time maintains a soft, mealy, baked potato interior. It is particularly important to note that use of a pre-fry creates a very crisp, rigid surface in the final product. This is a unique feature of the invention that cannot be duplicated by standard practices, i.e., leaching of the raw pieces followed by a par-fry in oil. Thus, application of a pre-fry, a water-leach, and a par-fry provides a means for setting a crisp texture in the French-fry and this texture is maintained on the consumer's plate. Without a pre-fry, French-fries, prepared simply by leaching in water and par-frying in oil, shrivel on the consumer's plate and exhibit a rubbery exterior. Moreover, it is of no consequence whether the French-fries of the invention are prepared for the table by baking in an oven or by finish-frying in oil. The process of the invention fixes a crisp texture in the potato strip that is maintained equally well through either means of final preparation.

In the case of potato chips, the invention maintains crispness and potato flavor, as well as yielding a desirable color. On the other hand, if raw potato slices are merely leached in water without a prior pre-fry, the chips have a tough, carboard-like texture and very little flavor.

Another advantage of the invention in relation to potato chips can be explained as follows: In current practice potato chips are prepared by slicing peeled potatoes and frying the slices in oil. During the fry the potato slices often develop "blisters" wherein several layers of tissue separate from other tissue and assume a bubble-like form. Not only do these blisters detract from the appearance of the chips, but they can also trap oil, thus raising the oil content and lowering the nutritional value of the chips. Potato chips prepared in accordance with the invention are free from blisters. A combination of the steps of pre-frying and leaching in water avoid this undesirable blistering effect.

DETAILED DESCRIPTION OF THE INVENTION

In a practice of the invention, raw potatoes are first subjected to the usual preliminary steps such as washing, peeling, and cutting into pieces. The shape and dimensions of the pieces will be dictated by the type of product desired. For example, for preparing potato chips, the tubers are cut into slices about 0.05 to 0.07 inch thick. For preparing French-fries, the tubers are cut into strips having a square cross-section about 3/16 to ½ inch on a side. The pieces may be rinsed with cold water to remove surface particles as is the usual practice, but this is not critical in our process.

Next, the raw potato pieces are pre-fried, that is, fried for a short period in hot oil. Generally, the temperature of the oil is about from 325° to 375°F. However, lower or higher temperatures will provide at least some of the benefits of the invention. Temperatures above 390°F. should be avoided as most cooking oils deteriorate rapidly under such conditions. At temperatures below about 325°F., oil uptake by the potato pieces is unduly increased. Thus, the oil temperature is preferably maintained at the stated range to avoid these extremes.

The time of pre-frying will depend on such factors as the oil temperature, the thickness of the potato pieces, and the color desired in the final product, and generally will range from about 5 to 120 seconds. In any event, care must be taken that the pieces are not fried long enough to turn brown, as such color change is oftentimes irreversible. In the case of potato chips, pre-fry times usually fall within the range of 5 to 60 seconds or until an irreversible brown color is just beginning to form. For French-fries, best results are obtained with a time of 15 to 90 seconds, subject to the size of the strips. It is preferred to pre-fry strips over ⅜ inch square for about 30–90 seconds. For smaller sizes, about 15–60 seconds is usually sufficient. For larger potato pieces it may be necessary to extend the pre-fry time to at least 120 seconds to obtain the desired color and texture in the products.

Following the pre-frying step, the potato pieces are leached by contacting them with water, for example, by immersing the pieces in water or by spraying or flooding water over them. The temperature of the water may range from just above freezing (about 33°F.) to the boiling point (212°F.). The higher temperatures in this range have the desirable effect that sugars are removed faster, but have the less desirable effect of reducing flavor and texture. Usually, it is preferred to use a water temperature in the range of about 100° to 150°F.

The time of leaching will depend on such factors as the sugar content of the potatoes, the temperature of the leach water, and the color that the processor desires in the final product. Generally, leaching is conducted for a period of about 1 to 30 minutes.

During the leaching step, oil introduced in the pre-frying step washes out the potato pieces. This oil can be readily recovered from the leach water by skimming, decanting, or centrifugation. The recovered oil is then dried and reused for frying.

After the potato pieces have been pre-fried and leached, they may be treated in any number of ways prior to distribution to the wholesaler, food service operator, or consumer. The treatment used will depend on the kind of product desired. For example, in the production of potato chips, the pre-fried and leached slices are finish-fried and packaged for distribution. Typically, the finish-frying is carried out in conventional manner by immersing the slices in hot (about 325° to 375°F.) oil until frothing ceases. This product would, of course, be ready for direct consumption. In the production of French-fries, any of various alternative treatments may be applied. One procedure involves surface-drying the pre-fried and leached strips by contacting them with hot air, for example, air at about 150°–250°F. Following this the strips are chilled or frozen (i.e., refrigerated to a temperature of about 40°F. or below), and distributed in such state to the consumer or food service operator. To prepare it for the table the product is finish-fried in hot oil or baked in the oven. A preferred procedure which provides French-fries with superior texture, i.e., crisp exterior with mealy interior, involves the following treatment. The pre-fried and leached strips are par-fried, typically, by frying in oil at about 355° to 370°F. for about 30–90 seconds to set the exterior texture and remove excess moisture. The par-fried strips are then chilled or frozen (i.e., refrigerated to a temperature of about 40°F. or below), and distributed to the consumer or food service operator. To prepare it for the table, the refrigerated product is treated conventionally, i.e., finish-fried in hot oil or baked in the oven. If the potato product is used in a specific preparation, such as a frozen T.V. dinner, a par-fry longer than 90 seconds may be required to develop a texture that will be maintained when the dinner is baked in the oven.

In the foregoing description, emphasis is directed to the application of the invention to potatoes which exhibit excessive browning tendencies. The invention is, of course, not so restricted but is applicable to potatoes of any type, even those of acceptable browning tendencies, since the invention yields benefits in areas other than color, e.g., in texture and flavor.

The invention is further demonstrated by the following examples.

EXAMPLE 1

Potato Chips from High-sugar Potatoes: Effect of Pre-fry and Leach Times.

The potatoes used in this example were Kennebec variety, stored at 42°–45°F. for 6 to 8 months, containing 2.6% dwb (dry weight basis) reducing sugars.

The potatoes were washed, peeled and sliced (approximately 0.060 inch thick).

Lots of the slices were pre-fried in oil at 365°F. for different times (5, 10, 20, 30, and 45 seconds).

The pre-fried slices were then leached in water at 104°F. for 10 or 15 minutes.

Finally all of the slices were finish-fried in hot oil (365°F.) until frothing ceased (standard practice).

a control was also prepared in which some of the potato slices were finish-fried without pre-frying or leaching.

The chips were examined for color, texture, appearance (uniformity of color), and flavor. The color was gauged by comparison with a set of color standards used in the industry: Potato Chip Color Reference Standard prepared by the Potato Chip Institute International, 940 Hanna Bldg., Cleveland, Ohio 44115. The standard colors are numbered 0 to 10, with the higher number indicating darker color. Products generally regarded as acceptable in the trade are those which exhibit colors 3–5; products of color less than 3 are usually considered too light; those of color higher than 5 are usually considered too dark.

The conditions applied and the results obtained are summarized in the following table.

TABLE I

| Run | Time of pre-fry, sec. | Time of leach, min. | Color |
|---|---|---|---|
| 1 | 5 | 15 | 4.5 |
| 2 | 10 | 15 | 4.0 |
| 3 | 20 | 10 | 4.5 |
| 4 | 20 | 15 | 3.5 |
| 5 | 30 | 10 | 4.5 |
| 6 | 30 | 15 | 4.0 |
| Control | — | — | 10 |

The products in accordance with the invention exhibited excellent flavor, texture, and color. The control chips were not only excessively dark, but also exhibited an undesirable charred-sugar taste.

EXAMPLE 2

Potato Chips from Low-sugar Potatoes: Effect of Pre-fry and Leach Times.

The potatoes used in this example were Kennebec variety, reconditioned to lower the content of reducing sugars to 1.8% (dwb).

Potatoes were washed, peeled, sliced (to 0.060 inch thick), and pre-fried in oil at 365°F. for 20 seconds. Groups of the pre-fried slices were leached in water at 150°F. for 5 and 10 minutes, respectively, and finish-fried until frothing ceased. The chips were tested as described in Example 1.

In this case, two controls were prepared. Control A was prepared by finish-frying some of the potato slices without pre-frying or leaching. In the case of Control B, a lot of raw potato slices was leached with water at 150°F. for 10 minutes, then finish-fried.

The following is a tabulation of the results.

| Run | Leach time, min. | Color |
|---|---|---|
| 1 | 5 | 4.0 |
| 2 | 10 | 3.5 |
| Control A | — | 7.5 |
| Control B | 10 | 7.5 |

The texture, appearance, and flavor, as well as the color, of the chips of the invention (Runs 1 and 2 above) were excellent. On the other hand, Control A had a very poor flavor (charred sugar) and Control B had a greatly reduced flavor and a cardboard-like texture.

EXAMPLE 3

Potato Chips from High-sugar Potatoes: Effect of Temperature of Leach Water.

The potatoes described in Example 1 were used. They were washed, peeled, and cut into slices approximately 0.06 inch thick.

The potato slices were pre-fried in oil at 365°F. for 15 seconds, and lots of the pre-fried slices were leached in water at 198°, 104°, 74°, and 34°F., respectively, for various times, then finish-fried in hot oil until frothing ceased. The resulting chips were tested as in Example 1.

Controls were also run wherein raw potato slices were leached under the same conditions as for the pre-fried slices, and then finish-fried.

The results are tabulated below.

TABLE III

| Run | Leach Conditions | | Color |
|---|---|---|---|
| | Temp., °F. | Time, min. | |
| 1 | 198 | 3 | 4.5 |
| Control A | do. | do. | 7.0 |
| 2 | 198 | 4 | 4.0 |
| Control B | do. | do. | 5.5 |
| 3 | 104 | 10 | 5.0 |
| Control C | do. | do. | 9.0 |
| 4 | 104 | 15 | 3.0 |
| Control D | do. | do. | 9 + |
| 5 | 74 | 15 | 4.5 |
| Control E | do. | do. | 9 + |
| 6 | 34 | 20 | 5.0 |
| Control F | do. | do. | 9.0 |
| 7 | 34 | 30 | 5.0 |
| Control G | do. | do. | 9.0 |

The chips in accordance with the invention exibited not only good color but also crisp texture and excellent flavor. The products of Runs 1, 3, and 6 had particularly good flavor. The appearance of color in the chips was uniform. On the other hand, the control chips had greatly reduced flavor and a carboard-like texture, as well as dark color.

EXAMPLE 4

Large French-fries from High-sugar Potatoes: Effect of Leach Time and Temperature.

The potatoes used in this example were Russet Burbank variety, stored at 42°–45°F. for 6 months, containing 5.3% (dwb) reducing sugars.

The potatoes were washed, peeled, and cut into strips 3/8 inch square in cross-section. The strips were pre-fried in oil at 365°F. for 30 seconds. Lots of the pre-fried strips were leached in water at 104°F. or 158°F. for various times. The leached strips were then contacted with a current of hot (250°F.) air for 2 minutes or for a time sufficient to remove surface water. The strips were then frozen to $-30°$ F. in a blast freezer. To prepare them for consumption and testing, frozen forzen strips were finish-fried in oil at 365°F. for 3 minutes.

The French-fries so prepared were examined for color, appearance (uniformity of color), texture, and flavor. With regard to texture, it may be noted that good quality French-fried potatoes have a crisp exterior and a mealy interior. The color was gauged by comparison with a set of color standards used in the industry: USDA Color Standards for Frozen French Fried Potatoes, No. 64-1, 2nd ed. 1966, Munsell Color Co., Inc., Baltimore, Md. The standard colors are numbered 0 to 4, with the higher numbers indicating darker color. Products generally regarded as acceptable in the trade are those which exhibit colors 1 or 2; products of color less than 1 are too light; those of color higher than 2 are generally too dark.

As controls, some of the raw potato strips were leached under the same conditions as for the pre-fried strips. After leaching, the control strips were processed as in commercial practice, i.e., par-fried in oil at 365°F. for 60 seconds, frozen at $-30°$ F., and finish-fried in oil at 365°F. for 3 minutes. The control French-fries were examined in the same manner as explained above.

The treatments applied and the results obtained are summarized in the following table.

| Run | Leach conditions | | Color |
|---|---|---|---|
| | Temp., °F. | Time, min. | |
| 1 | 158 | 15 | 2.0 |
| Control A | do. | do. | 3.5 |
| 2 | 158 | 20 | 1.5 |
| Control B | do. | do. | 2.5 |
| 3 | 104 | 20 | 2.0 |
| Control C | do. | do. | 3.5 |

Besides having acceptable color, the fries of the invention had an excellent uniform appearance and a crisp exterior and mealy interior. On the other hand, the control fries were not crisp and tended to be wet in the interior and rapidly shriveled after finish-frying.

EXAMPLE 5

Large Fries from High-sugar Potatoes: Effect of Par-fry.

The potatoes used in these trials were those described in Example 1. The potatoes were washed, peeled, and cut into strips ⅜ inch square in cross-section.

The strips were pre-fried in oil at 365°F. for 1 minute. Then, lots of the pre-fried strips were leached at 70°F. or 150°F. for various times. Following the leach, the strips were par-fried in oil at 365°F. for 30 or 60 seconds. The par-fried strips were then frozen to $-30°$F. in a blast freezer. To prepare them for consumption and testing, the frozen strips were finish-fried in oil at 365°F. for 2.5 minutes. The French-fries so prepared were examined as set forth in Example 4.

For comparison, controls were also prepared wherein raw potato strips were leached under the same conditions as in the case of the pre-fried strips. After leaching, the control strips wre processed as described above, i.e., par-fried, frozen, then finish-fried.

The results obtained are summarized below.

TABLE V

| Run | Leach conditions | | Par-fry | Color |
|---|---|---|---|---|
| | Temp., °F. | Time, min. | time, sec. | |
| 1 | 150 | 15 | 30 | 2.0 |
| Control A | do. | do. | do. | 3.5 |
| 2 | 150 | 15 | 60 | 2.0 |
| Control B | do. | do. | do. | 3.5 |
| 3 | 70 | 20 | 30 | 2.0 |
| Control C | do. | do. | do. | 4 + |
| 4 | 70 | 20 | 60 | 2.0 |
| Control D | do. | do. | do. | 4 + |

The data indicate that the par-fry after leaching does not diminish the benefits of the invention. Excellent color is obtained. In addition, texture was excellent in that the fries exhibited a crisp exterior complimented by a very mealy interior.

It should be noted that increasing the par-fry time from 30 to 60 seconds enhanced crispness.

EXAMPLE 6

Small French-fries from High-sugar Potatoes: Effect of Several Variables.

The potatoes used in these trials were Russet Burbank variety containing 2.5% (dwb) reducing sugars. The potatoes were washed, peeled, and cut into strips ¼ inch square in cross-section.

The strips were divided into groups and pre-fried in oil at 365°F. for 15 or 30 seconds. Subgroups of the pre-fried strips were leached in water at 150°F. for various times. Then, strips from each treatment were par-fried in oil at 365°F. for 30, 60, or 90 seconds. The par-fried strips were frozen to $-34°$ F. in a blast freezer. To prepare them for consumption and testing, the frozen strips were finish-fried in oil at 365°F. for 2.5 minutes. the French-fries so prepared were examined as set forth in Example 4.

For purpose of comparison, controls were also prepared wherein raw potato strips were leached in water at 150°F. for 15 minutes, par-fried in oil at 365°F. for 30, 60, or 90 seconds, frozen at $-34°$ F., and finish-fried for 2.5 minutes in oil at 365°F.

The treatments applied and the results obtained are summarized below.

TABLE VI

| Run | Pre-fry time, sec. | Leach time, min. | Par-fry time, sec. | Color |
|---|---|---|---|---|
| 1 | 15 | 10 | 30 | 1.5 |
| 2 | do. | do. | 60 | 2.0 |
| 3 | do. | do. | 90 | 2.0 |
| 4 | 15 | 15 | 30 | 1.5 |
| Control A | 0 | do. | do. | 3.5 |
| 5 | 15 | 15 | 60 | 1.5 |
| Control B | 0 | do. | do. | 3.5 |
| 6 | 15 | 15 | 90 | 2.0 |
| Control C | 0 | do. | do. | 3.5 |
| 7 | 30 | 10 | 30 | 1.5 |

TABLE VI-continued

| Run | Pre-fry time, sec. | Leach time, min. | Par-fry time, sec. | Color |
|---|---|---|---|---|
| 8 | do. | do. | 60 | 2.0 |
| 9 | do. | do. | 90 | 2.0 |
| 10 | 30 | 15 | 30 | 1.5 |
| 11 | do. | do. | 60 | 1.5 |
| 12 | do. | do. | 90 | 2.0 |

The products of the invention exhibited not only good color but also excellent flavor and texture in that they remained rigid (non-limp) even after cooling on the plate. The control products had reduced flavor and when cooled became limp and soggy.

EXAMPLE 7

The potatoes used in these trials were Russet Burbank variety containing 2.5% (dwb) reducing sugars. The potatoes were washed, peeled, and cut into strips ¼ inch square in cross-section.

A lot of the strips was pre-fried in oil at 365°F. for 15 seconds, then leached in water at 150°F. for 15 minutes. Sub-lots of the leached strips were par-fried in oil at 365°F. for 30, 60, or 90 seconds. The par-fried strips were frozen to − 34° F. in a blast freezer. To prepare them for consumption and testing, the frozen strips were finish-baked in an oven at 425°F. The baking time varied from 6–9 minutes for the 90-second par-fried strips to 10–14 minutes for the 30-second par-fried strips. The French-fries so prepared were examined immediately after preparation and after standing in the open air. It was observed that the products were crisp and rigid (not limp) and retained both crispness and rigidity throughout the period of observation (30 minutes).

Controls were prepared wherein the pre-frying was omitted, that is, the raw strips were leached at 150°F. for 15 minutes, par-fried for 30, 60, or 90 seconds, frozen to − 34° F., and finally finish-baked in the oven at 425°F. It was observed that these control French-fries were initially crisp but shriveled quickly (in about 5–10 minutes) and became limp and soggy.

Having thus described our invention, we claim:
1. A process for enabling the preparation of fried potato products of improved properties from raw potato pieces which exhibit excessive browning tendencies, which comprises -
   a. pre-frying pieces of raw potato in oil at a temperature about from 325° to 375°F. for a time which is not long enough to cause said pieces to turn brown and which falls within the range of about 5 to 120 seconds, and
   b. leaching the pre-fried pieces in water for a period about from 1 to 30 minutes, and
   c. preparing said leached slices for consumption by frying.

2. The process of claim 1 wherein the potato pieces are slices having a thickness of about 0.05 to 0.07 inch, and wherein the pre-frying is for about 5 to 60 seconds.
3. The process of claim 1 wherein the potato pieces are strips having a square cross-section about 3/16 to ½ inch on a side, and wherein the pre-frying is for about 15 to 120 seconds.
4. A process for preparing a stock for the production of French-fries from raw potato pieces which exhibit excessive browning tendencies, which comprises -
   a. cutting raw potatoes into strips,
   b. pre-frying the raw potato strips in oil at a temperature about from 325° to 375°F. for a time which is not long enough to cause said pieces to turn brown and which falls within the range of about 15 to 120 seconds,
   c. leaching the pre-fried strips in water for a period about from 1 to 30 minutes,
   d. surface-drying the leached strips,
   e. refrigerating the surface-dried strips to a temperature of about 40°F. or below, and
   f. holding the refrigerated strips at a temperature of about 40°F. or below until they are to be prepared for consumption by frying.
5. A process for preparing French-fries from raw potato pieces which exhibit excessive browning tendencies, which comprises -
   a. cutting raw potatoes into strips,
   b. pre-frying the raw potato strips in oil at a temperature about from 325° to 375°F. for a time which is not long enough to cause said pieces to turn brown and which falls within the range of about 15 to 120 seconds,
   c. leaching the pre-fried strips in water for a period about from 1 to 30 minutes,
   d. par-frying the leached strips in hot oil at about 355° to 370°F for about 30 to 90 seconds,
   e. refrigerating the par-fried strips to a temperature of about 40°F. or below, and
   f. holding the refrigerated strips at a temperature of about 40°F. or below until they are to be prepared for consumption by frying.
6. A process for preparing potato chips from raw potato pieces which exhibit excessive browning tendencies, which comprises -
   a. cutting raw potatoes into slices having a thickness of about 0.05 to 0.07 inch,
   b. pre-frying the raw potato slices in oil at a temperature time which is not long enough to cause said pieces to turn brown and which falls within the range of about from 325° to 375°F. for a about 5 to 60 seconds,
   c. leaching the pre-fried slices in water for a period about from 1 to 30 minutes, and
   d. preparing said leached slices for consumption by finish-frying said slices in hot oil.

* * * * *